US010019756B2

(12) United States Patent
Atkins

(10) Patent No.: US 10,019,756 B2
(45) Date of Patent: Jul. 10, 2018

(54) SYSTEMS AND METHODS FOR THROTTLING TRANSACTION PROCESSING BASED ON CONSTRAINED SUB-SYSTEMS

(71) Applicant: MasterCard International Incorporated, Purchase, NY (US)

(72) Inventor: Michael Clay Atkins, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 116 days.

(21) Appl. No.: 14/231,094

(22) Filed: Mar. 31, 2014

(65) Prior Publication Data
US 2015/0277964 A1  Oct. 1, 2015

(51) Int. Cl.
| | | |
|---|---|---|
| G06Q 40/00 | (2012.01) | |
| H04L 29/08 | (2006.01) | |
| G06F 11/34 | (2006.01) | |
| H04L 29/06 | (2006.01) | |
| H04L 29/14 | (2006.01) | |
| G06Q 20/02 | (2012.01) | |
| G06Q 20/40 | (2012.01) | |
| H04L 12/863 | (2013.01) | |
| H04L 12/823 | (2013.01) | |

(52) U.S. Cl.
CPC ......... *G06Q 40/00* (2013.01); *G06F 11/3419* (2013.01); *H04L 67/00* (2013.01); *H04L 67/42* (2013.01); *H04L 69/40* (2013.01); *G06Q 20/027* (2013.01); *G06Q 20/401* (2013.01); *H04L 47/32* (2013.01); *H04L 47/624* (2013.01)

(58) Field of Classification Search
CPC .... G06Q 40/00; G06Q 20/027; G06Q 20/401; G06F 11/3419; H04L 67/00; H04L 67/42; H04L 69/40; H04L 47/32; H04L 47/624
See application file for complete search history.

(56) References Cited

U.S. PATENT DOCUMENTS

| | | |
|---|---|---|
| 7,328,134 B1 | 2/2008 | Burbidge, III et al. |
| 7,606,401 B2 | 10/2009 | Hoffman et al. |
| 7,617,303 B2 | 11/2009 | Duggirala |
| 7,870,251 B2 | 1/2011 | Streijl |
| 7,882,075 B2 | 2/2011 | Suzuki et al. |
| 8,484,371 B2 | 7/2013 | Mansharamani |
| 8,559,967 B2 | 10/2013 | Froehlich et al. |

(Continued)

*Primary Examiner* — S. Sough
*Assistant Examiner* — Kimberly L Jordan
(74) *Attorney, Agent, or Firm* — Armstrong Teasdale LLP

(57) ABSTRACT

A computer-based method for throttling payment card transaction processing is provided. The method uses a computer device including a processor and a memory. The method includes identifying, in the memory, a first threshold level. The method also includes transmitting a first plurality of transaction requests to a sub-processing system. The method further includes computing, by the processor, an average response time of the sub-processing system for processing the first plurality of transaction requests. The method also includes receiving a second plurality of transaction requests. The method further includes identifying one or more of the second plurality of transaction requests as failure candidates based at least in part on the average response time and the first threshold level. The method also includes failing one or more of the failure candidates.

24 Claims, 8 Drawing Sheets

(56) References Cited

U.S. PATENT DOCUMENTS

| | | | | |
|---|---|---|---|---|
| 2001/0051924 A1* | 12/2001 | Uberti | ............... | G06Q 20/02 |
| | | | | 705/44 |
| 2003/0149702 A1* | 8/2003 | Saffer | ............... | G06F 17/30595 |
| 2004/0123297 A1* | 6/2004 | Flautner | ............... | G06F 1/3203 |
| | | | | 718/102 |
| 2007/0271219 A1* | 11/2007 | Agarwal | ............... | G06F 11/008 |
| 2014/0278642 A1* | 9/2014 | Robinson | ......... | G06Q 10/06311 |
| | | | | 705/7.15 |

* cited by examiner

SYSTEMS AND METHODS FOR THROTTLING TRANSACTION PROCESSING BASED ON CONSTRAINED SUB-SYSTEMS

BACKGROUND OF THE DISCLOSURE

This disclosure relates generally to payment card transaction systems and, more specifically, to systems and methods for throttling processing steps associated with payment card transactions based on constrained sub-systems.

Conventional payment card transaction systems perform high volumes of payment card transactions. During a typical payment card transaction, a transaction processing system receives an authentication request from, for example, a merchant acquirer. In some situations, the transaction processing system is under a service level agreement (SLA) to provide a response to the authentication request within a predetermined period of time (SLA response time), such as 3 seconds. If the transaction processing system does not respond to the authentication request within the SLA response time, the transaction automatically fails. Such failed transactions are detrimental to both the payment processor as well as the other parties to the transaction, such as the cardholding consumer or the merchant.

During some payment card transactions, consumers (i.e., cardholders) provide biometric samples that may be used to authenticate the consumer as an authorized user of the payment card. The transaction processing system may utilize a sub-processing system, such as a third-party system, to authenticate the sample biometric data (e.g., comparing a sample fingerprint to a reference fingerprint of the authorized user). During normal operations, the sub-processing system may, for example, respond to an authentication request within 1 second. However, under certain circumstances, such as periods of heavy transaction volume, the sub-processing system may become constrained. For example, under heavier volumes, the response time for authentication requests may increase to 5 seconds. This increase in time caused by the sub-processing system may cause the overall transaction to fail.

BRIEF DESCRIPTION OF THE DISCLOSURE

In one aspect, a computer-based method for throttling payment card transaction processing is provided. The method uses a computer device including a processor and a memory. The method includes identifying, in the memory, a first threshold level. The method also includes transmitting a first plurality of transaction requests to a sub-processing system. The method further includes computing, by the processor, an average response time of the sub-processing system for processing the first plurality of transaction requests. The method also includes receiving a second plurality of transaction requests. The method further includes identifying one or more of the second plurality of transaction requests as failure candidates based at least in part on the average response time and the first threshold level. The method also includes failing one or more of the failure candidates.

In another aspect, a computing device for throttling payment card transaction processing is provided. The computing device includes a processor communicatively coupled to a memory. The computing device is programmed to identify a first threshold level. The computing device is also programmed to transmit a first plurality of transaction requests to a sub-processing system. The computing device is further programmed to compute an average response time of the sub-processing system for processing the first plurality of transaction requests. The computing device is also programmed to receive a second plurality of transaction requests. The computing device is further programmed to identify one or more of the second plurality of transaction requests as failure candidates based at least in part on the average response time and the first threshold level. The computing device is also programmed to fail one or more of the failure candidates.

In yet another aspect, at least one non-transitory computer-readable storage media having computer-executable instructions embodied thereon is provided. When executed by at least one processor, the computer-executable instructions cause the processor to identify a first threshold level. The computer-executable instructions also cause the processor to transmit a first plurality of transaction requests to a sub-processing system. The computer-executable instructions further cause the processor to compute an average response time of the sub-processing system for processing the first plurality of transaction requests. The computer-executable instructions also cause the processor to receive a second plurality of transaction requests. The computer-executable instructions further cause the processor to identify one or more of the second plurality of transaction requests as failure candidates based at least in part on the average response time and the first threshold level. The computer-executable instructions also cause the processor to fail one or more of the failure candidates.

BRIEF DESCRIPTION OF THE DRAWINGS

FIG. 1 is a schematic diagram illustrating an example multi-party transaction card industry system throttling transaction processing based on constrained sub-processing systems.

FIG. 2 is a simplified block diagram of an example transaction processing system (TPS) for throttling transaction processing based on constraint in sub-processing systems.

FIG. 3 is an expanded block diagram of an example embodiment of a server architecture of a TPS including other computer devices in accordance with one embodiment of the present disclosure.

FIG. 4 illustrates an example configuration of a user system operated by a user, such as the cardholder shown in FIG. 1.

FIG. 5 illustrates an example configuration of a server system such as the server system shown in FIGS. 2 and 3.

FIG. 6 is an example payment transaction environment including a payment processing system in which processing steps are managed by a throttling component based on constraint in a sub-processing system.

FIG. 7 is an example method for throttling authorization requests in the interchange environment shown in FIG. 6.

FIG. 8 shows an example configuration of a database within a computing device, along with other related computing components, that may be used to throttle authorization request message transmission to the sub-processing system shown in FIG. 6.

DETAILED DESCRIPTION OF THE DISCLOSURE

Figure 1:
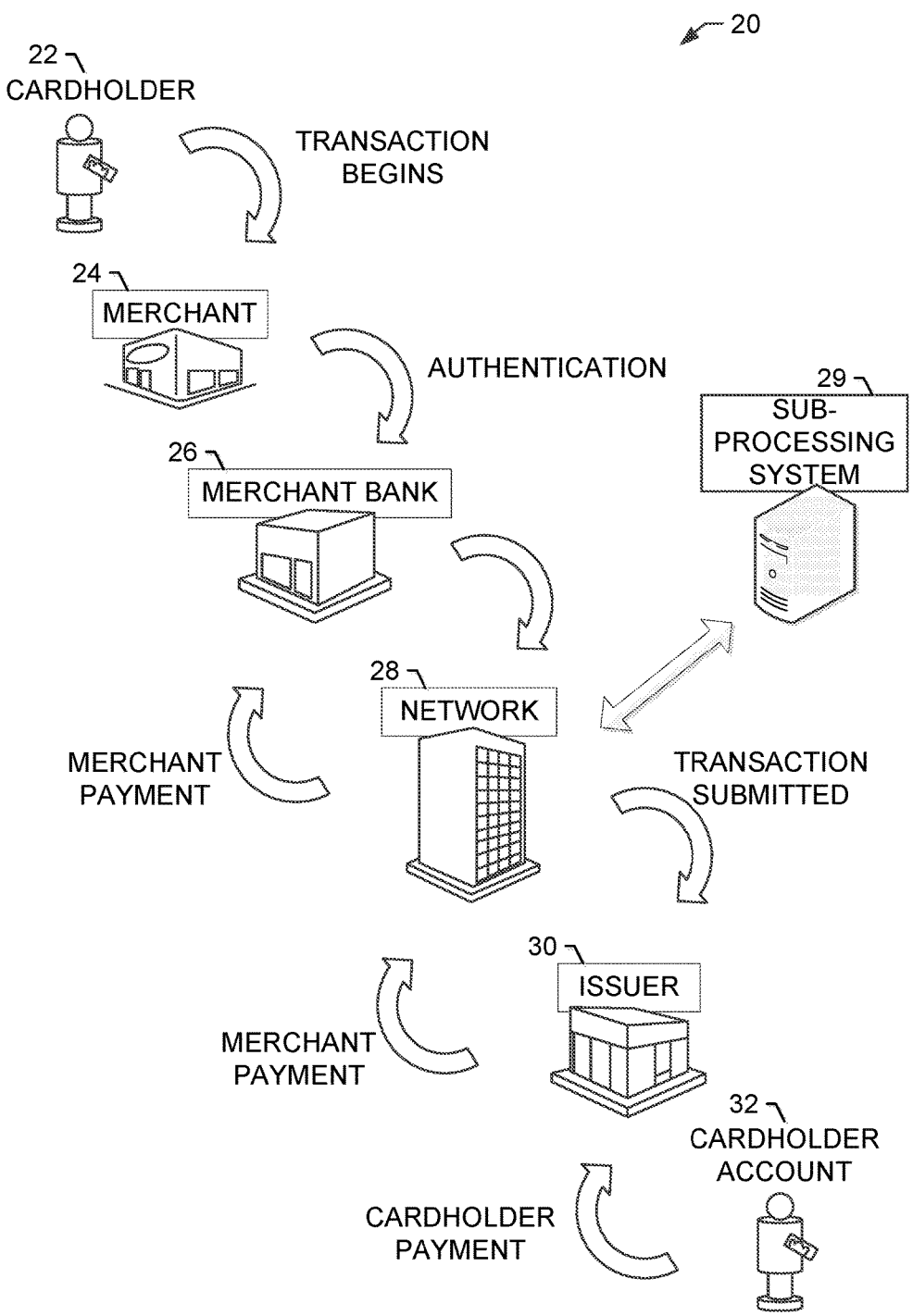
FIGS. 1-8 show example embodiments of the methods and systems described herein.

Systems and methods are described herein for throttling transaction processing based on constraints in a sub-processing system. In the example embodiment, a transaction processing system utilizes a sub-processing system to authenticate sample biometric data collected from a cardholder during a payment card transaction. The transaction processing system transmits an authentication request to the sub-processing system. The sub-processing system performs the necessary processing steps to perform the authentication, and the sub-processing system transmits a response back to the transaction processing system.

Further, the transaction processing system includes a throttling component that monitors the time taken to process a transaction. The transaction processing system may be under a service level agreement (SLA) that defines a maximum response time to process each authentication request. The throttling component monitors the response times for authentication requests (e.g., the amount of time elapsed between the time an authentication message is sent to the sub-processing system and the time a response is received from the sub-processing system). In some embodiments, three average response times are continuously computed and monitored: a 1-minute average, a 5-minute average, and a 15-minute average. The throttling component computes a weighted average from these three averages, referred to herein as a weighted average response time (WAVG).

During periods of heavy volume, the average response time(s) of the sub-processing system may climb. In some unrestrained situations, higher response times may cause the transaction processing system to become noncompliant with the SLA and thus cause some transactions to fail. If the response times of the sub-processing system exceed the SLA response time requirement, most or all transactions may fail due to the SLA timeout. The throttling component utilizes a mathematical system to measure the constraint, or "busyness," of the sub-processing system and dynamically adjusts, or "throttles," the volume of requests sent to the sub-processing system. Throttling helps improve the number of transactions that can be successfully submitted and processed within the boundaries of the SLA, and based on the busyness of the sub-processing system.

In one example embodiment, the throttling component compares the weighted average to a series of threshold values defining two or more throttling tiers. The top throttling tier represents a relatively unconstrained sub-system (e.g., weighted average response time of 1 second), in which the transaction processing system will transmit its full volume of requests (i.e., little or no throttling). Lower tiers represent some level of throttling. To implement throttling, the throttling component selects a certain number of transactions for failure prior to submission to the sub-processing system. As such, some transactions may fail, but the load reduction eases the burden on the sub-processing system such that the sub-processing system may handle the remaining requests within acceptable SLA times.

In another example embodiment, the throttling component compares a set of decaying weighted averages to a series of threshold values. The set includes averages covering various spans of time, including short and long periods of time. The threshold values are, in some embodiments, percentages of the maximum response time allowed by the SLA. The threshold value percentages are converted into response time boundaries. The throttling component makes throttling decisions by comparing the short and long period averages to the response time boundaries. Changes in the most recent series of short period averages define a trend.

For example, the throttling component may compute a trend by comparing response times from a most recent window of time, $t_0$, against response times from the previous windows of time, $t_1$ and $t_2$. If the average response time of window $t_0$ is 1.2 seconds, and the prior times were $t_1$=1.1 seconds and $t_2$=1.0 seconds, respectively, then the busyness of the sub-processing system is increasing (e.g., the response times are slower now than they were in the prior windows, and getting longer in each subsequent window). Accordingly, as the response times of the sub-processing system are projected to approach the SLA time, the throttling component restricts the requests sent to the sub-processing system by reducing the volume, or rate, of requests sent.

As the trending starts to improve (e.g., the response times for the sub-processing system start to decrease), the throttling component eases restrictions on the volume or rate of requests sent to the sub-processing system. For example, if the response time at window $t_0$=1.0, and the prior times were $t_1$=1.1 seconds and $t_2$=1.2 seconds, then the busyness of the sub-processing system is decreasing. Accordingly, as the response times of the sub-processing system are projected to move away and below the SLA time, the throttling component will increase the volume, or rate, of requests sent.

A technical effect of the systems and processes described herein include at least one of: (a) identifying, in the memory, a first threshold level; (b) transmitting a first plurality of transaction requests to a sub-processing system; (c) computing, by the processor, an average response time of the sub-processing system for processing the first plurality of transaction requests; (d) receiving a second plurality of transaction requests; (e) identifying one or more of the second plurality of transaction requests based at least in part on the average response time and the first threshold level; (f) failing the one or more of the second plurality of transaction requests; (g) computing a decaying weighted average response time over a window of time; (h) identifying a throttle level for transactions sent to the sub-processing system; (i) altering the throttle level based at least in part on the average response time; (j) comparing a demand for transaction processing and the throttle level, wherein altering the throttle level is further based at least in part on the comparing; and (k) comparing the average response time and a service level agreement (SLA) time, wherein altering the throttle level is further based at least in part on the comparing.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions and, more specifically, for throttling transaction processing based on constrained subsystems. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

In the example embodiment, cardholder 22 may provide a biometric sample along with the authorization request, such as through a biometric reader at a point of sale device (not shown in FIG. 1). During authorization, one or more parties to the transaction, such as network 28, may communicate with a sub-processing system 29 that is configured to perform an authentication sub-process associated with the transaction. In the example embodiment, sub-processing system 29 performs authentication of biometric data for payment card transactions. During operation, network 28 transmits biometric authentication requests to sub-processing system 29 as a part of the overall authentication process for payment card transactions. In some situations, sub-processing system 29 may become constrained such that response times are delayed.

When a request for authorization (i.e., authorization request) is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
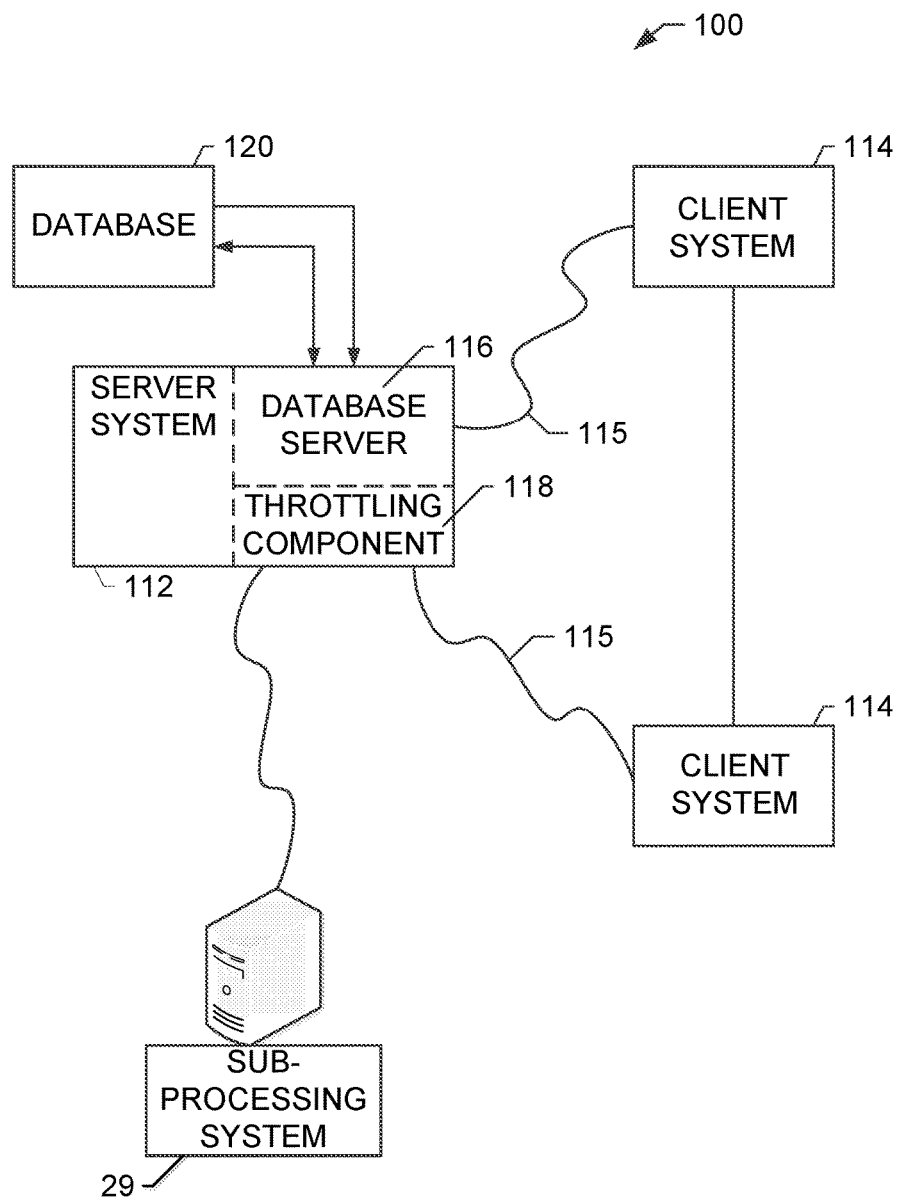

FIG. 2 is a simplified block diagram of an example transaction processing system (TPS) 100 for throttling transaction processing based on constraints in sub-processing systems. TPS 100 includes a plurality of computer devices connected in communication in accordance with the present disclosure. In the example embodiment, TPS 100 may be used for processing payment card transactions in the interchange environment shown in FIG. 1.

More specifically, in the example embodiment, system 100 includes a server system 112 in communication with sub-processing system 29 and/or other client systems 114 associated with merchants, merchant banks, payment networks, and/or issuer banks. In the example embodiment, at least one sub-processing system 29 receives, from server system 112, biometric authentication requests of payment card transactions, and provides responses to server system 112. In some embodiments, sub-processing system 29 is a third-party computing system. In other embodiments, sub-processing system 118 system 29 may be a component or module executed by server system 112. In still other embodiments, sub-processing system 29 may be associated with any of the parties to the transaction authorization process.

In the example embodiment, server system 112 is also in communication with a plurality of client sub-systems, also referred to as client systems 114. In one embodiment, client systems 114 are computers including a web browser, such that server system 112 is accessible to client systems 114 using the Internet. Client systems 114 and/or sub-processing system 29 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment. Server system 112 also includes a throttling component 118.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store liability acceptance information associated with parties to the transaction, such as merchants, merchant banks, payment networks, and/or issuer banks. Further, database 120 may also store rules for default liability and/or liability acceptance indicators for particular transactions.

In the example embodiment, one of client systems 114 may be associated with acquirer bank 26 (shown in FIG. 1) while another one of client systems 114 may be associated with issuer bank 30 (shown in FIG. 1). Server system 112 may be associated with interchange network 28 (shown in FIG. 1) or a payment processor. In the example embodiment, server system 112 is associated with a network interchange, such as interchange network 28, and may be referred to as an interchange computer system or a payment processing computing device. Server system 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

Figure 3:
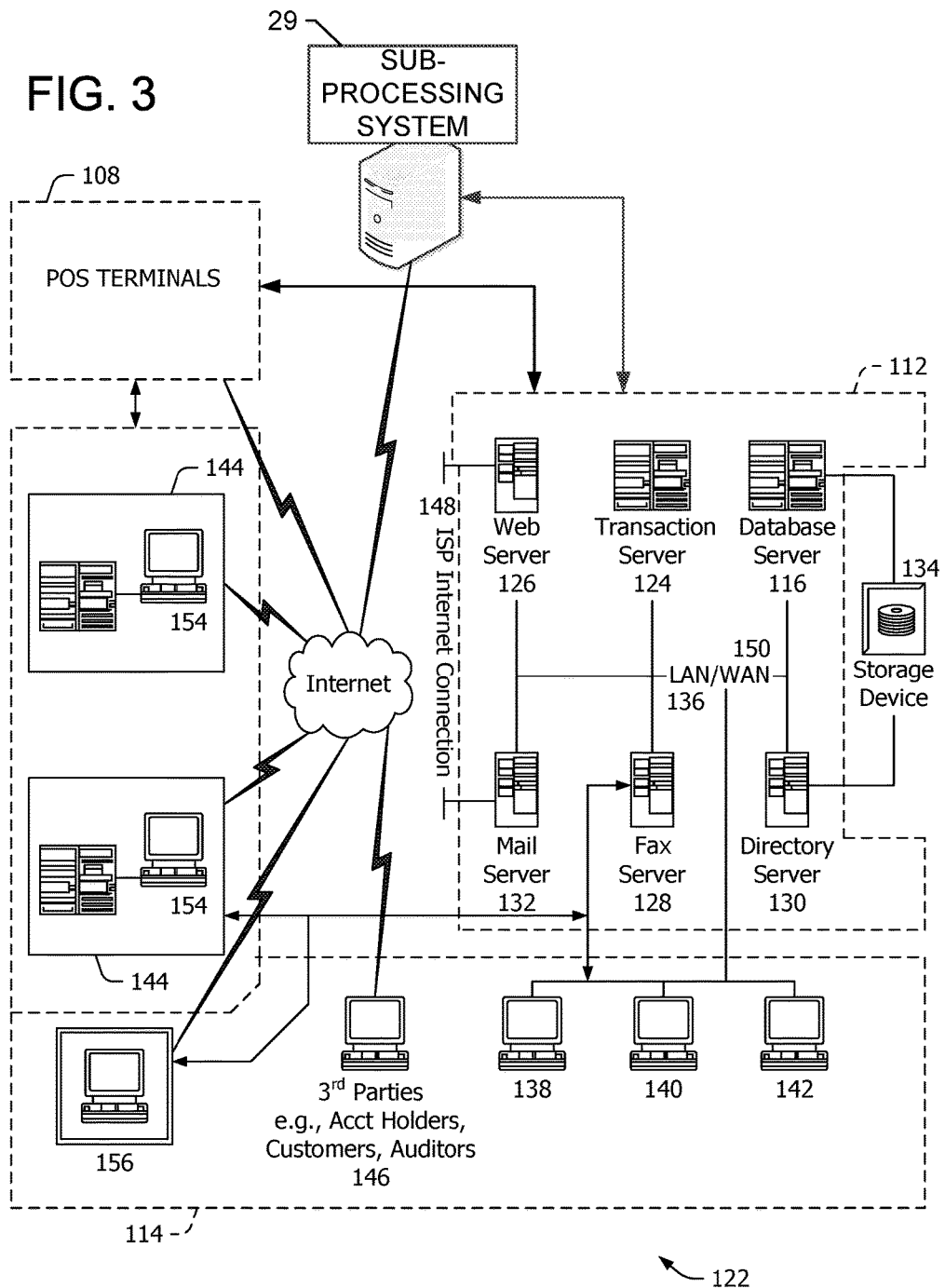

FIG. 3 is an expanded block diagram of an example embodiment of a server architecture of a transaction processing system (TPS) 122 including other computer devices in accordance with one embodiment of the present disclosure. Components in system 122, identical to components of TPS 100 (shown in FIG. 2), are identified in FIG. 3 using the same reference numerals as used in FIG. 2. Transaction processing system 122 includes server system 112, client systems 114, POS terminals 108, and sub-processing system 29. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems 114 includes a manager workstation 156 located at a remote location. Workstations 154 and 156 are personal computers having a web browser. Also, workstations 154 and 156 are configured to communicate with server system 112. Furthermore, fax server 128 communicates with remotely located client systems 114, including a workstation 156 using a telephone link. Fax server 128 is configured to communicate with other workstations 138, 140, and 142 as well.

Figure 4:
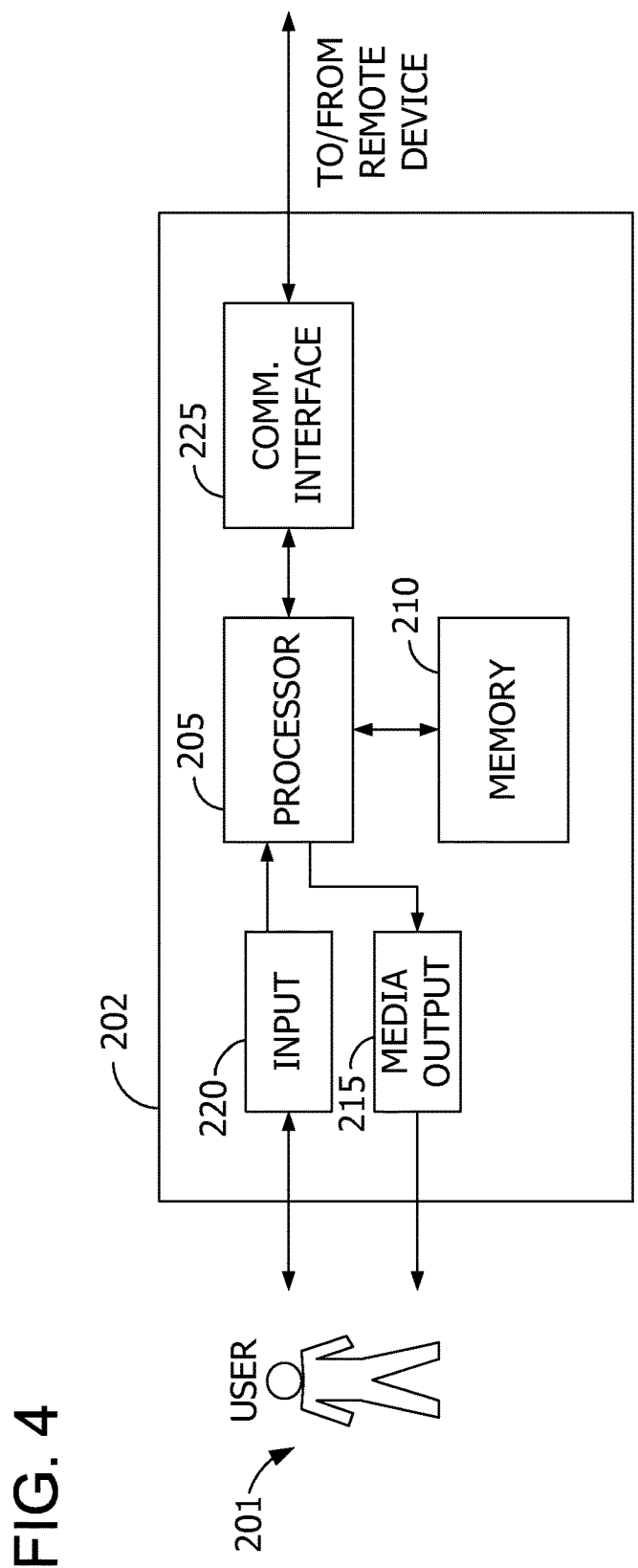

FIG. 4 illustrates an example configuration of a user system 202 operated by a user 201, such as cardholder 22 (shown in FIG. 1). User system 202 may include, but is not limited to, client systems 114, 138, 140, and 142, POS terminal 108, sub-processing system 29, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
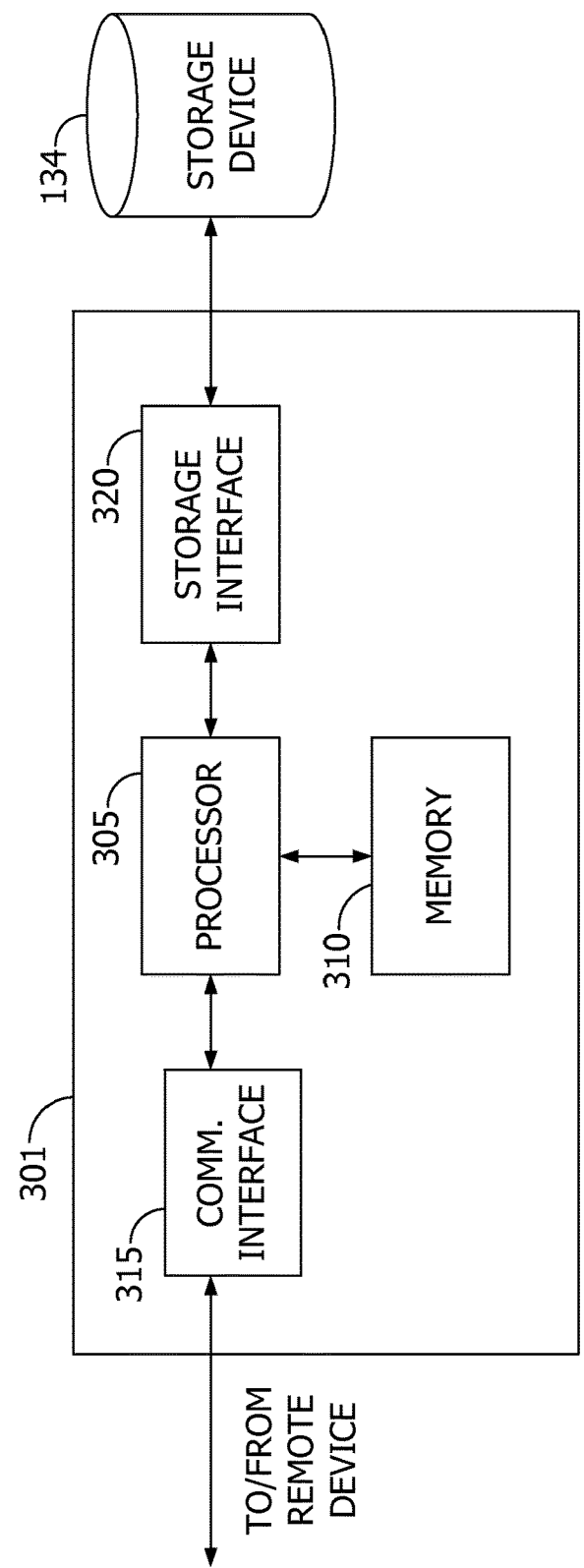

FIG. 5 illustrates an example configuration of a server system 301 such as server system 112 (shown in FIGS. 2 and 3). In some embodiments, server system 301 may be similar to sub-processing system 29 (shown in FIGS. 1-3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client systems 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
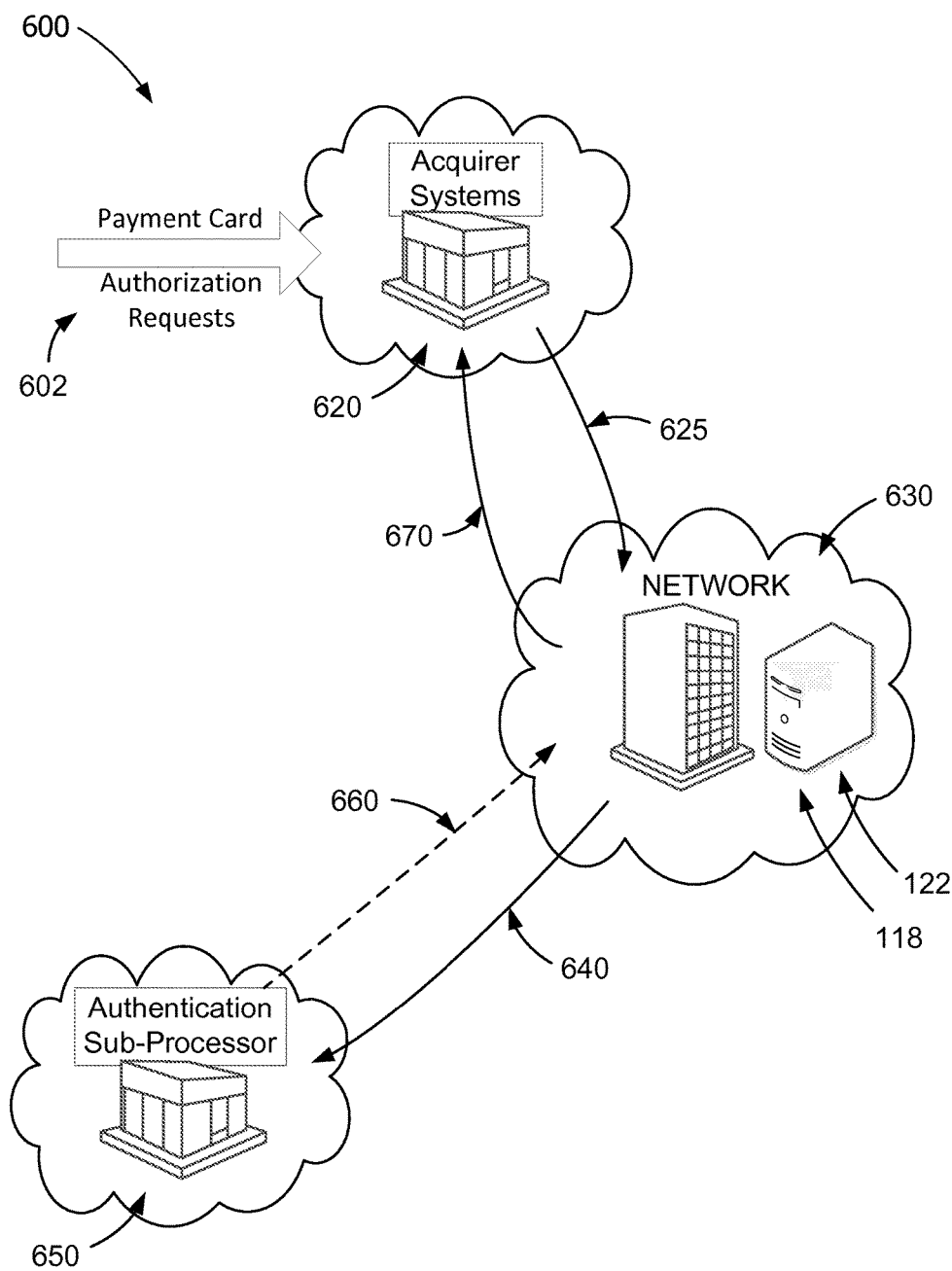

FIG. 6 is an example payment transaction environment 600 including transaction processing system 122 in which processing steps are managed by throttling component 118 based on constraints in a sub-processor system 650. In the example embodiment, payment card authorization requests 602 are transmitted to acquirer banks 26 (shown in FIG. 1) and/or acquirer processing systems 620. Acquirer systems 620 are in communication with an interchange network 630 (e.g., a payment processor such as network 28 (shown in FIG. 1)) and, more specifically, with payment processing system 122. Acquirer systems 620 interact with network 630 during authorization of payment card transactions.

In the example embodiment, acquirer systems 620 communication authorization requests 602 to network 630 for authentication processing. Further, network 630 is under a service level agreement (SLA) to respond to some authorization requests 602 within a predefined period of time such as, for example, within 3 seconds, or within 6 seconds. If network 630 does not respond within an SLA time, the authorization request 602 may fail. In other words, if network 630 does not provide a quick enough response, the authorization request 602 will be denied. As such, the timeliness of authorization request processing by network 630 impacts the amount of failed authorization requests, which negatively affects many parties involved, such as the consumer and the merchant. As used herein, the phrase service level agreement (SLA) time may be used to refer to a contractually agreed-upon response time cap, or it may be used more generally to refer to a maximum processing time that a processing system is given to respond to a request, regardless of how the SLA time is set.

Payment card authorization requests 602, in the example embodiment, include biometric data associated with a payment card consumer (e.g., a person presenting a payment card to purchase goods or services). More specifically, during the initiation of a payment card transaction, the consumer may provide a biometric sample such as, for example, a fingerprint, an iris scan, or a facial scan. The biometric sample is used during the authentication of the consumer (i.e., used to determine whether or not the consumer is the underlying cardholder).

As is known in the art, biometric samples may be used to authenticate individuals. One known, broad method of biometrics (i.e., biometric authentication) involves collecting a biometric sample (e.g., biometric identifiers) of a suspect (i.e., the person under examination) and comparing that sample to an authentic, pre-collected "target sample" or "reference sample" of a target individual (i.e., the person privileged for authentication). Known biometric identifiers include physiological characteristics such as, for example, fingerprint, face recognition, palm print, hand geometry, iris recognition, retina and odor/scent, and may also include behavioral characteristics such as, for example, typing rhythm, gait, and voice. Comparison algorithms are often specific to the particular type of biometric data at issue. Some biometric comparisons are known to be computationally intensive. In addition, target sample data may be considered sensitive, and may require careful data protection procedures.

In the example embodiment, network 630 is in communication with a sub-processor 650. In some embodiments, sub-processor 650 is a third-party entity that provides authentication services and support processing related to biometric samples of cardholders 22 (shown in FIG. 1). For example, sub-processor 650 may be a governmental entity or another entity, such as an issuing bank, that matches biometric data with target samples from a repository of biometric target samples and other associated data that may be used to authenticate payment card transactions (e.g., establishing biometric identity). In other embodiments, sub-processor 650 is a server or application component within network 630. In still other embodiments, sub-processor 650 supports additional tasks associated with payment card authorization requests.

In the example environment 600, a "suspect" consumer provides a biometric sample as a part of payment card authorization request 602. Network 630 receives 625 the biometric sample along with authorization request 602 and transmits 640 the biometric sample and other associated authentication data to sub-processor 650. Sub-processor system 650 identifies a target sample from the other associated authentication data, compares the biometric sample to the target sample, and responds 660 to network 630 with biometric authentication data, such as affirming or denying the authentication. After receipt of the biometric authentication response 660, and after performing any other authentication processing, network 630 responds 670 to the authorization request 602 with an authorization response indicating the network's 630 disposition on authentication.

In the example embodiment, network 630 monitors response times associated with the processing of authorization requests 602. The time that elapses between receipt 625 of an authorization request 602 and the response 670 by the network 630 to the authorization request 602 is a "response time" for that particular request in the example embodiment (i.e., complete processing request time). In other embodiments, network 630 monitors a response time as the time that elapses between transmission 640 of the biometric authentication request to sub-processor 650 and response 660 back from the request (i.e., sub-processing request time).

In the example embodiment, a throttling component 118 monitors individual response times and manages aspects of biometric transmissions 640 to sub-processing system 650. In some embodiments, throttling component 118 computes an average response time, $X_t$, of complete processing request time and/or sub-processing request time, where $X_t$ represents the average response time in a particular window of time t. In other embodiments, average response times may be computed based on a number of transactions such as, for example, the most recent n completed transactions.

In another embodiment, throttling component 118 computes and/or periodically maintains a plurality of averages such as, for example, 1-minute average, $X_1$, a 5-minute average, $X_5$, and a 15-minute average, $X_{15}$. As such, each particular average, $X_t$, represents the average response time in a recent window of time t. In other words, the 1-minute average, $X_1$, represents the average response time (e.g., complete processing request time, or sub-processing request time) within, for example, the past 60 seconds, the 5-minute average, $X_5$, representing the average response time within the past 5 minutes, and so forth for other averages, $X_t$.

Further, throttling component 118 may compute a weighted average, WAVG, of the plurality of response time averages, where each particular average value is multiplied by an associated weight, $w_x$. For example:

$$WAVG = w_1 X_1 + w_5 X_5 + w_{15} X_{15}. \quad (1)$$

In some embodiments, weights $w_x$ may be pre-determined values. In other embodiments, weights $w_x$ may be dynamically adjusted based on, for example, historical trends or current trends.

In some of the example embodiments presented herein, such as associated with equation (1), three averages are included into the weighted average, WAVG. It should be understood, however, that other response time averages, weighting values, and/or weighting schemes may be used, and are within the scope of this disclosure.

In the example embodiment, network 630 uses response time averages, $X_t$, to throttle transmissions 640 of processing requests to sub-processor 650. More specifically, in one embodiment, throttle component 118 uses weighted average WAVG to throttle transmissions 640 to sub-processor 650. The response time averages of sub-processor 650 may be viewed as an aspect of health of sub-processor 650. Under less-constrained situations, sub-processor 650 may process a biometric authentication request, for example, in less than 1 second. In these more relaxed circumstances, network 630 may easily meet the SLA response time requirements for authorization requests 602, since sub-processor 650 is able to timely process requests.

As sub-processor 650 becomes more constrained, however, average response times may start to rise. As average response times of sub-processor 650 rise, so too may the overall response times of network 630, since sub-processor's processing time is a part of the network's overall response time. Sub-processor 650 may become constrained based on, for example, a higher rate/volume of request processing, or other processing demands. If sub-processor 650, for example, takes a full 3 seconds to respond to a particular request, and network's 630 SLA for response is only 3 seconds, the response 670 may be too late to complete the authorization request.

Continuing the constraint example, when average response times rise too high, authorization requests may start naturally failing at high rates, such as, for example, by time out due to SLA timer expiration. In other words, when constraint (and average response times) of sub-processor 650 rise too high, most or all authorization requests 602 may not be completed within the SLA time.

In the example embodiment, throttle component 118 monitors the average response times of sub-processor 650 and, broadly speaking, starts to throttle (i.e., limit) the volume of transmissions 640 to sub-processor 650 as response times degrade. Throttle component 118 selects one or more failure candidates (i.e., transactions that it may fail to alleviate load to sub-processor 650) from the set of incoming authorization requests 602.

More specifically, in one embodiment, throttle component 118 includes a throttle table. The throttle table identifies a plurality of tiers. Each tier is identified by a response time range and a throttle rate (or other throttle limiting mechanism) (generally referred to herein as a threshold or threshold level). For example, consider the following throttle table:

TABLE 1

| Throttle Table, Rate-Limited | |
|---|---|
| Avg. Response Time | Maximum Rate |
| <1.5 seconds | Unlimited |
| 1.5-2.0 seconds | 10,000 |

TABLE 1-continued

| Throttle Table, Rate-Limited | |
|---|---|
| Avg. Response Time | Maximum Rate |
| 2.0-2.5 seconds | 6,000 |
| >2.5 seconds | 2,000 |

Each row of table 1 (i.e., each "throttling tier") includes a response time range and a maximum rate. In the example embodiment, the response time range is associated with a weighted average response time, WAVG, as described above in reference to equation (1), and the maximum rate is in a number of transmissions 640 (e.g., biometric authentication requests to sub-processor 650) per second. In other words, an average response time of under 1.5 seconds is associated with an unlimited maximum rate (i.e., no throttling, network 630 will transmit 640 all authorization requests received), an average response time of between 1.5 and 2.0 seconds is associated with a maximum rate of 10,000 transmissions 640 per second, and so forth. As used herein, the term "throttling tier" and "threshold level" are used to refer to a particular row of Table 1, and/or the associated values therein.

During operation, in the example embodiment, throttle component 118 regularly computes WAVG, as well as a current rate of transmissions 640 (i.e., a rate of how many transmissions 640 per unit time that network 630 is sending to sub-processor 650). Throttle component 118 also determines, from the throttle table, the maximum rate associated with the current WAVG. Throttle component 118 will then monitor the present rate of transmissions 640 as compared to the maximum rate. In some embodiments, throttling component 118 updates dynamic values, such as WAVG and the current transmission rate, after each associated event, such as after each transmission 640 or after each receipt 660. In other embodiments, the dynamic values are recomputed a periodic intervals, such as every 100 milliseconds.

In the example embodiment, if the rate of transmission is greater than the maximum rate, throttle component 118 will stop sending transmissions 640 to sub-processor 650 until the current rate dips below the maximum rate. In other words, new requests 602 received while above the maximum rate will be failure candidates. If the current rate is below the maximum rate, throttle component 118 will not restrain transmissions 640 until the current rate rises up to or above the maximum rate. This method of throttling is referred to herein as "maximum-threshold-based throttling." Throttling methods generally describe when to start throttling and which authorization requests 602 are selected for failure and which are selected for transmission 640 and further processing. Other throttling method embodiments are described below.

In the example embodiment, when a maximum transmission rate threshold is reached, throttle component 118 starts failing authorization requests 602. In other words, throttle component 118 will select some of the received 625 authorization requests 602 as failure candidates and exclude those requests from transmission 640. In some embodiments, network 630 and/or throttling component 118 declines requests as they are received 625 (e.g., a new request 602 is failed or otherwise declined shortly after receipt 625). This failure method is referred to herein as "prompt failing." In other embodiments, throttling component 118 may maintain a queue of pending requests 602 (e.g., failure candidates), where each pending request includes an indicator of an amount of remaining time associated with that request. As such, throttling component 118 may consider remaining time of requests in the queue when selecting which of a set of pending authorization requests to fail. Further, such considerations may also consider an estimation of the remaining processing time of pending requests, which may also include an average response time of sub-processor 650. This failure method is referred to herein as "queued failing." In some embodiments, other factors may be evaluated prior to selecting which requests to fail. For example, throttling component 118 may give priority to certain types of transactions, or transactions for a certain classes of payment card, or transactions for certain merchants, merchant banks, or issuers. As such, transactions may be prioritized, or rated, based on one or more factors, and that rating may be used to select which transactions get selected for failing.

Further, in some embodiments, failure candidate requests that are selected for failure are expressly declined. In other words, network 630 sends a decline message back to acquirer system 620 within the SLA time for that request, indicating the decline of the request. This decline technique is referred to herein as "express decline." In other embodiments, network 630 does not send a decline message back to acquirer system 620 within the SLA time. In other words, the request selected for failure is allowed merely to "time out" or fail as a natural cause of the SLA timer functionality. This decline technique is referred to herein as "time-out decline." It will be appreciated by those skilled in the art that various combinations of failure methods and decline techniques are possible, and within the scope of the present disclosure.

During operation, in the example embodiment, throttling component 118 monitors dynamic values associated with sub-processor 650 as described above. Using these values, throttling component 118 determines a throttling tier based on current conditions, and then limits transmissions 640 to sub-processor 650 as defined by the throttling tier. Generally, as sub-processor's 650 average response times increase (i.e., becomes more constrained), throttling component 118 starts limiting the number of transmissions 640 sent to sub-processor 650 and fails some requests 602 to effect that limiting.

For example, presume that network 630 receives 625 a constant rate of authorization requests 602 of 12,000 requests per second. Presume, also, that sub-processor 650 is in a relatively-unconstrained state such that it has a weighted average response time, WAVG, of 1.0 seconds (e.g., $X_1$=1.0 seconds, $X_5$=1.0 seconds, and $X_{15}$=1.0 seconds). In this state, throttling component 118 determines, from the throttling table shown in Table 1 above, that the maximum throttling rate associated with an average response time of 1.0 seconds is "unlimited." As such, throttling component 118 will not throttle transmissions 640 to sub-processor 650. In other words, all 12,000 requests per second received 625 by network 630 will be transmitted 640 to sub-processor 650 for processing.

Now presume that sub-processor 650 begins to become more constrained such that average response times degrade to WAVG=1.7 seconds. In this state, throttling component 118 determines, from the throttling table, that the maximum throttling rate associated with WAVG=1.7 seconds is now "10,000." As such, throttling component 118 will throttle transmissions 640 to sub-processor 650 such that only 10,000 requests per second will be sent. In other words, of every 12,000 requests 602 received 625, only 10,000 will be sent to sub-processor, leaving the remaining 2,000 requests to be failed.

Now further presume that sub-processor 650 again deteriorates to a point of constraint in which WAVG=2.2 seconds. Similar to above, in this state, throttling component 118 determines that the maximum rate is now "6,000." As such, throttling component 118 throttles transmissions 640 down to only 6,000 requests per second sent to sub-processor 650, with the remaining 6,000 requests (of the 12,000 per second) to be failed.

As such, the throttling features provided by throttle component 118 serve to limit overall load on sub-processor 650, thus increasing the chances that the subset of requests that are transmitted 640 to sub-processor 650 will eventually succeed in meeting their overall SLA times for authentication.

In some embodiments, a "pool-of-threads-based throttling" method is used. Network 630 may maintain a pool of threads used to process authorization requests 602. Each authorization request 602 has an associated thread of processing, in a one-to-one relationship. When a request 602 is received 625, it receives an associated thread. After the request is fully processed and sent as response 670, the thread is released back to the pool for future use.

To effectuate rate limiting using the pool of threads, throttling component 118 may reference the following table:

TABLE 2

Throttle Table, Thread-Limited

| Avg. Response Time | Maximum Threads |
|---|---|
| <1.5 seconds | Unlimited |
| 1.5-2.0 seconds | 10,000 |
| 2.0-2.5 seconds | 6,000 |
| >2.5 seconds | 2,000 |

In this embodiment, each throttling tier includes a response time range and a maximum number of threads. In the example embodiment, the response time range is associated with a weighted average response time, WAVG, as described above in reference to equation (1), and the maximum number of threads provided by system 122.

During operation, system 122 initially processes each new request 602 as it is received 625. To be processed, each request 602 needs a thread. As such, system 122 provisions a thread from a pool of threads for the new request. In this embodiment, to effect throttling of transmissions 640 to sub-processor 650, throttle component 118 limits the number of transmissions 640 by limiting the receipt 625 of authorization requests 602 at an early stage of processing. More specifically, throttle component 118 limits the association of requests 602 with threads, as they are received 625, by restricting the size of the pool of available threads. In an unconstrained scenario (e.g., weighted average response time of sub-processor 650 less than 1.5 seconds), throttle component 118 does not restrict the number of requests 602 processed (i.e., allows for an unlimited number of threads to be associated to requests 602). In constrained scenarios (e.g., the other rows of Table 2, with average response times >1.5 seconds), throttling component 118 puts an upper bound on the number of threads in the pool of threads.

For example, presume a scenario in which a number of active threads is currently 8,000 (i.e., 8,000 authorization requests 602 have been received 625 and are currently in progress). Under such conditions, throttling component 118 limits the maximum number of threads to 10,000 (based on Table 2), but because there are only 8,000 requests 602 currently in process (i.e., 8,000 threads in use), there have been no requests 602 denied a thread. Now presume that the WAVG of sub-processor 650 climbs quickly from 1.7 seconds to 2.2 seconds. Under such conditions, throttling component will limit the number of threads to 6,000 (based on Table 2). For example, in some embodiments, when the maximum number of threads has been reached, throttling component 118 may identify an incoming request 602 as a failure candidate and immediately fail the transaction (e.g., prompt failing) based on an unavailability of a thread for the request 602.

At the beginning of this scenario, however, there are currently 8,000 pending authorization requests 602, an amount which exceeds the current pool maximum of 6,000. In the example embodiment, any new request received 625 under these conditions will be denied a thread. The inbound request may be queued, as per the "queued failing" method described above, or may be immediately declined, as per the "prompt failing" method described above. As such, no new request will be afforded a thread until the pool of used threads drops down to below 6,000.

Further, in some embodiments, when reducing the maximum number pool of threads (i.e., when shifting to a lower row of Table 2), throttling component 118 may not immediately reduce the number of threads maintained, but rather may allow the size to be reduced by the normal attrition of processing and/or SLA expiration. In other embodiments, throttling component 118 may immediately reduce the number of threads maintained. As such, some threads may be cancelled and not allowed to proceed through to completion. For example, in the example fact pattern above, with 8,000 threads currently active at the time of shifting from a pool of 10,000 threads down to 6,000 threads, the throttling component 118 may terminate 2,000 currently-active threads. In some embodiments, throttling component 118 may select threads based on their time in process (e.g., the requests in process the longest amount of time, and thus closest to their SLA expiration times, or e.g., the requests in process the shortest amount of time, as they are farthest from being completed). In other embodiments, throttling component 118 may select threads based on whether or not they have already been transmitted 640 to sub-processor 650 for processing. For example, throttling component 118 may cancel threads that have not yet been transmitted 640 to sub-processor 650. In still other embodiments, several of these methods may be employed as a hybrid method for selecting threads to terminate.

In other embodiments, a "percentage-based throttling" method is used. To effectuate rate limiting using the percentages, throttling component 118 may reference the following table:

TABLE 3

Throttle Table, Percentage-Limited

| Avg. Response Time | Fail Percentage |
|---|---|
| <1.5 seconds | 0% |
| 1.5-2.0 seconds | 20% |
| 2.0-2.5 seconds | 50% |
| >2.5 seconds | 80% |

In this embodiment, each throttling tier includes a response time range and a failure percentage. In the example embodiment, the response time range is associated with a single average response time and failure percentage value.

During operation, throttle component 118 identifies a failure percentage associated with the current average response time for sub-processor 650. For example, presume a 1-minute average response time of 1.7 seconds for sub-processor 650. Accordingly, throttling component 118 identifies a failure percentage value of 20%. Under this tier of throttling, 20% of authorization requests 602 are selected for failure, and thus the remaining 80% of authorization requests 602 are transmitted 640 to sub-processor 650 for continued processing.

In some embodiments, to effectuate the identified failure percentage, throttling component 118 selects some of every few new requests 602 for failure as they arrive (e.g., for 20%, selecting 1 of every 5 new requests). In some embodiments, this may be implemented as a round-robin failure mechanism. In other embodiments, throttling component 118 implements the failure percentage as a probability of failure and, for example, applies a random number generator or other randomizing variable to use for each individual request 602 to determine whether or not that particular request 602 is either failed or transmitted 640. As such, throttling component 118 fails approximately 20% of authorization requests 602.

Additionally, in some embodiments, the failure values identified in the second column of each throttle table (i.e., the looked-up value) may be a composite value rather than a pre-determined, fixed value. For example, in Table 1, maximum rate values may be computed as a percentage of a maximum. E.g., first-tier may be 1.0*10,000, second-tier may be 0.8*10,000, third-tier may be 0.6*10,000, and so forth. Further, the maximum rate value may be dynamically adjusted over time based on, for example, historical data.

In some embodiments, throttling component 118 regularly re-predicts a number or volume of requests (e.g., a "thread cap," or a maximum number of threads or pending requests) that sub-processing system 650 can process before causing SLA times to be exceeded. In the example embodiment, throttling component 118 computes a series of averages to determine trends in the recent processing times of sub-processing system 650. From these averages, throttling component 118 computes a decaying weighted average, $L_w$, that is used to make decisions about restrictions on requests sent to sub-processing system 650.

More specifically, in the example embodiment, throttling component 118 regularly re-computes a decaying weighted average, $L_w$, for a window of time, w:

$$L_w = (1-e^{-R})Q_z + (e^{-R})(L_{w-1}), \quad (2)$$

where $Q_z$ is a quantity being measured, z is an index to the quantity being measured, and $L_{w-1}$ is the prior value for the decaying weighted average in the prior window, w−1. In the example embodiment, throttling component 118 computes a simple average over a small period of time (e.g., 5 seconds) of the response time values of requests recently completed by sub-processing system 650. The quantity being measured, $Q_z$, is that simple average of response times during the small period of time, indexed by z. Further, R is a ratio describing the proportional impact of $Q_z$ on the weighted average, $L_w$:

$$R = \frac{T_z - T_{z-1}}{D}, \quad (3)$$

where D is the period of duration of the window for the average, $L_w$, in units of time (e.g., 60 seconds), $T_z$ is a time value the instance in time when $Q_z$ was computed (and is in the same units as D), and $T_{z-1}$ is a time value the instance in time when $Q_{z-1}$ was computed (and is also in the same units as D). In the example embodiment, throttling component 118 re-computes $L_w$ every 5 seconds, and computes both a 1-minute average (e.g., D=60 seconds), a 5-minute average (e.g., D=300 seconds), and a 15-minute average (e.g., D=900 seconds). As such, at each calculation, the window slides.

Further, in the example embodiment, throttling component 118 implements a decision matrix to determine when to limit the number or rate of transactions being transmitted to sub-processing system 650 (e.g., when to take action). The decision matrix evaluates two general ratios:

$$R1 = \frac{\text{Demand}}{\text{Throttle}}, \quad (4)$$

and $$R2 = \frac{\text{Duration}}{\text{SLA}}. \quad (5)$$

In regard to the ratio R1, Demand represents a weighted decaying average of transactions per sliding window (e.g., 1-minute sliding window). Throttle is the number of requests currently sent and to sub-processing system 650 and still outstanding (e.g., the number of active threads). Thus the ration R1, generally, evaluates the number of requests coming into throttling component 118 as compared to the current throttle level setting. Generally, when R1 is greater than 1.0, throttling component 118 is receiving more requests than it is processing. Conversely, when R1 is less than 1.0 throttling component 118 is processing more requests than it is taking in.

In regard to the ratio R2, Duration is a weighted decaying average time taken, in units time, for sub-processing system to complete requests (e.g., the 1-minute weighted average, $L_w$). In some embodiments, the same sliding window is used to compute Duration (e.g., 1-minute sliding window). SLA is the service level agreement (SLA) time for processing requests, in units time, and as described above. Thus the ratio R2, generally, evaluates the current response times of sub-processing system 650 to the SLA time. When R2 is greater than 1.0, sub-processing system 650 is generally not completing transactions in time. Conversely, when R2 is less than 1.0, sub-processing system 650 is generally completing transactions before they expire.

In the example embodiment, the decision matrix compares these two ratios, R1 and R2, according to the following table:

TABLE 4

Decision Matrix

| | Scenario A | Scenario B | Scenario C | Scenario D |
|---|---|---|---|---|
| $R1 = \frac{\text{Demand}}{\text{Throttle}}$ | ≤1.0 | ≤1.0 | >1.0 | >1.0 |
| $R2 = \frac{\text{Duration}}{\text{SLA}}$ | ≤1.0 | >1.0 | ≤1.0 | >1.0 |
| Conclusion | Underutilized | Over-committed | Failsafe | Over-committed |
| Action | Growth risk | Force Reduction | Optimize | Force Reduction |

The "Conclusion" generally indicates the overall status of network 630. "Underutilized" indicates that the duration is within the SLA limits and there is excess capacity within sub-processing system 650. "Failsafe" indicates that the duration is within the SLA limits, but may indicate that some of the transactions are being rejected by the throttle limit. "Overcommitted" indicates that SLA limits are exceeded for the sample period, and sub-processing system 650 is overloaded (e.g., asked to perform more work than it can perform within the allotted SLA period). In the example embodiment, each of these scenarios are referred to herein as threshold levels. Further, the throttle level (e.g., the number of threads) and either of the ratios R1 and R2 may also be referred to herein as a threshold levels.

Scenario A, in the example embodiment, presents a growth risk. As such, throttling component 118 calculates a throttle limit that is likely needed within the next reaction time period, which may lead to increasing or decreasing the existing throttle limit. The goal is to create a throttle limit that, in the event of a spike in demand within the reaction time period, would cause a failsafe state implicitly. The demand trend and long-term averages provide guidance on the range of throttle limit reduction. As used herein, the term "reaction time period" is used, generally, to refer to a period of time between one analysis and the next.

Scenario C, in the example embodiment, indicates a failsafe state, and calls for optimization action. In this state, the network 630 is in a delicate balance (e.g., a quasi-equilibrium state), where network 630 is sending approximately the right amount of requests through to sub-processing system and rejecting approximately the right amount. Action by throttling component 118 may still be required, however. Optimization involves predicting if there is any sub-processing system 650 capacity available and possibly raising the throttle limit to allow more demand, or lowering the throttle limit to avoid exceeding the SLA. The goal is to maintain durations within the SLA. The demand trend and long-term averages provide guidance on how to tune the throttle limit.

Scenarios B and D, in the example embodiment, indicate an overcommitted or overloaded state that calls for a forced reduction action. Throttling component 118 reduces the throttling limit in an effort to drive toward the failsafe state. The demand trend and long-term averages provide guidance on how aggressively to reduce the throttle limit with a goal of reaching failsafe state within the next reaction time period.

Throttling component 118, in the example embodiment, evaluates the decision matrix every reaction period (e.g., every 5 seconds), with the window(s) (e.g., 1-minute, 5-minute, and 15-minute) sliding forward at each reaction period. Thus, throttling component 118 recalculates the weighted averages and ratios every reaction period, and then evaluates the decision matrix to determine a course of action.

In the example embodiment, throttling component also calculates a throttling value that would likely produce durations approximately equal or near to the SLA limit. Throttling component 118 calculates a transaction duration of future demand, g(n), at each reaction period:

$$g(n) = \frac{A * n}{D}, \quad (6)$$

where n is the future transaction demand, D is the duration of transactions processed in the period, and A is the actual number of transactions processed in the period. If s is the SLA limit, then:

$$s = g(n), \quad (7)$$

$$s = \frac{A * n}{D}, \text{ and} \quad (8)$$

$$n = \frac{D * s}{A}. \quad (9)$$

In the example embodiment, throttling component 118 estimates the likely demand at the next reaction period:

$$d(t) = \frac{(D_0 - D_{-r})}{r * (t + r) + D_{-r}}, \quad (10)$$

where $D_0$ is current demand, $D_{-r}$ is demand at time $-r$, t is time relative to $D_0$, and r is time relative to $D_0$.

Then, in the example embodiment, throttling component 118 calculates the throttle level. Given n(s), the maximum demand to maintain a specific SLA, g(n), the transaction duration of future demand, and d(r), the expected demand at time r, the throttle level is calculated as $$\text{throttle} = n(s) * \frac{g(d(r))}{\max(L_{s5}, L_{s15})}, \quad (11)$$

where $L_{s5}$ is the duration weight average over a 5 minute window, $L_{s15}$ is the duration weight average over a 15 minute window, and where $$\max(L_{s5}, L_{s15}) = \frac{1}{2}(L_{s5} + L_{s15} - |L_{s5} - L_{s15}|). \quad (12)$$

Effectively, throttling component 118 estimates what duration and demand will be over the next reaction time period. However, the throttle adjustment is tempered with the 5- and 15-minute averages. Further, in some embodiments, a factor is applied based on whether or not the throttle should be radically changed or gradually changed. During failsafe state, the weight factor is cut in half to cause a more granular adjustment.

In the example embodiment, system 122 implements processing threads for each active request 602, and throttling is implemented through restricting thread allocation to incoming requests 602 (e.g., through a thread cap), similar to that described above. For example, presume sub-processing system 122 has a pre-defined SLA time, such as 1,000 milliseconds (ms) to respond to requests 602 before they are considered delinquent or failed (e.g., 1,000 ms as computed from the time that throttling component 118 transmits the request to sub-processing system 650). Presume also that system 122, at time $t_0$, is experiencing an average response time $L_0$=800 ms, is currently transmitting a load of approximately 400 requests per minute (e.g., has 400 active threads), and has a current maximum number of requests or thread cap of 500 requests. As such, at time $t_0$, the 1-minute average response time $L_w$ is substantially below the SLA time (e.g., sub-processing system 650 is performing well enough such that few or no transactions are failing due to SLA timeout), and the volume of system 122 is below the thread cap (e.g., throttling component 118 is not currently denying any incoming requests 602).

Now presume, for example, that the response times of sub-processing system 650 begin to deteriorate (e.g., a Scenario A situation, in which the busyness of the sub-processing system is increasing). At a time $t_1$, $L_1$ is computed as 900 ms, and at time $t_2$, $L_2$ is computed as 1,000 ms. Throttling component 118 decreases the volume of requests if the trend and current response times forecast that the SLA will be exceeded or if the SLA has been exceeded. A comparison of the long period averages to the response time boundaries provide the throttling component with parameters for the rate of volume changed.

Now presume for example, that the response times of sub-processing system 650 begin to improve (e.g., a Scenario C situation, in which the busyness of the sub-processing system is decreasing). At a time $t_{10}$, $L_{10}$ is computed as 1000 ms, at time $t_{11}$, $L_{11}$ is computed as 900 ms, and at time $t_{12}$, $L_{12}$ is computed as 800 ms. Throttling component 118 increases the volume of requests if the trend and current response times forecast that the SLA will not be exceeded. Similarly, a comparison of the long period averages to the response time boundaries provide the throttling component with parameters for the rate of volume change (e.g., equation (10)). The long period averages prevent rapid fluctuations of the volume or "flapping".

Figure 7:
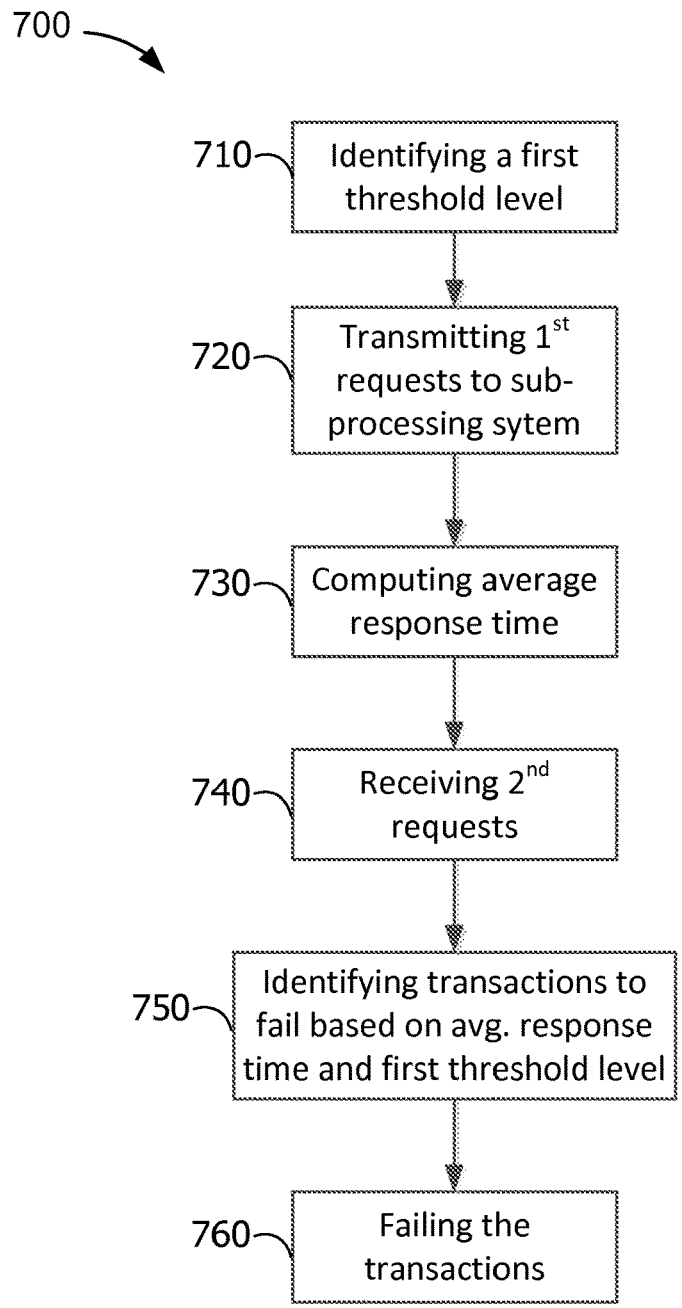

FIG. 7 is an example method 700 throttling authorization requests in an interchange environment 600 such as shown in FIG. 6. In the example embodiment, method 700 is performed by a throttling component such as throttling component 118 (shown in FIGS. 2 and 6) in conjunction with a computing system such as server system 112 (shown in FIG. 2), transaction processing system 122 (shown in FIGS. 3 and 6), or computing device 810 (shown in FIG. 8).

In the example embodiment, method 700 includes identifying 710, in the memory, a first threshold level. In some embodiments, the first threshold level is based at least in part on one or more of a demand for transaction processing and a throttle level for transactions sent to the sub-processing system. In other embodiments, the first threshold level is based at least in part on one or more of the average response time and a service level agreement (SLA) time. Method 700 also includes transmitting 720 a first plurality of transaction requests to a sub-processing system and computing 730, by the processor, an average response time of the sub-processing system for processing the first plurality of transaction requests. In some embodiments, computing an average response time further includes computing a decaying weighted average response time over a window of time.

Further, method 700 also includes receiving 740 a second plurality of transaction requests and identifying 750 one or more of the second plurality of transaction requests as failure candidates based at least in part on the average response time and the first threshold level. Further, method 700 includes failing 760 one or more of the failure candidates.

In some embodiments, method 700 includes identifying a throttle level for transactions sent to the sub-processing system, wherein identifying one or more of the second plurality of transaction requests further includes identifying based at least in part on the throttle level. Further, in some embodiments, method 700 may include altering the throttle level based at least in part on the average response time. Additionally, method 700 may include comparing a demand for transaction processing and the throttle level, wherein altering the throttle level is further based at least in part on the comparing. Method 700 may also include comparing the average response time and a service level agreement (SLA) time, wherein altering the throttle level is further based at least in part on the comparing.

Figure 8:
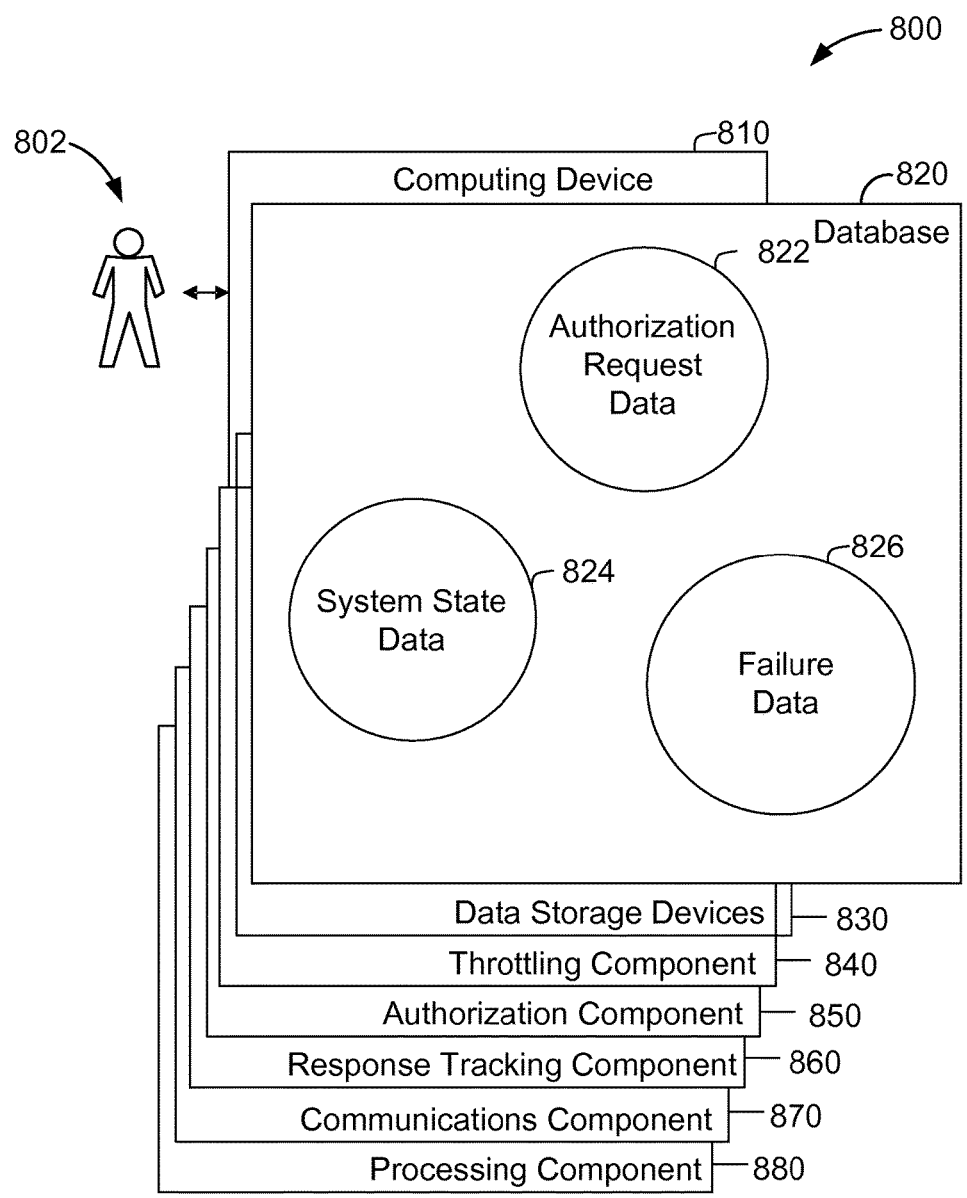

FIG. 8 shows an example configuration 800 of a database 820 within a computing device 810, along with other related computing components, that may be used to process payment card transactions and, more specifically, throttle authorization request message transmission to a sub-processing system such as sub-processor 650 (shown in FIG. 6). In some embodiments, computing device 810 is similar to server system 112 (shown in FIG. 2), transaction processing system 122 (shown in FIGS. 3 and 6), and/or server system 301 (shown in FIG. 5). Database 820 is coupled to several separate components within computing device 810, which perform specific tasks.

In the example embodiment, database 820 includes authorization request data 822, system state data 824, and failure data 826. In some embodiments, database 820 is similar to database 120 (shown in FIG. 2). Authorization request data 822 includes information associated with payment transaction authorization requests, such as authorization requests 602 (shown in FIG. 6). System state data 824 includes information associated with response times and average response times, current and historical data such as processing rates, such as described in reference to FIG. 6. Failure data 826 includes data associated with throttling component and failing of authorization requests, such as described in reference to FIG. 6.

Computing device 810 includes the database 820, as well as data storage devices 830. Computing device 810 also includes a throttling component 840, which may be similar to throttling component 118 (shown in FIGS. 2 and 6), for throttling submission of authorization requests to a sub-processing component, such as sub-processor 650 (shown in FIG. 6). Computing device 810 also includes an authorization component 850 for processing authorization requests. A response tracking component 860 is also included for tracking and managing authorization requests during their pendency at network 630 (shown in FIG. 6). A communications component 870 is also included for receiving authorization requests and transmitting sub-requests to sub-processing components, such as sub-processor 650. A processing component 880 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is a flexible system for throttling authorization processing based on constraint in sub-systems. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for throttling transaction processing, the method using a computer device including a processor and a memory, said method comprising:
   identifying, in the memory, a first threshold level for transaction processing in compliance with a service level agreement (SLA) time;
   receiving a first plurality of transaction requests;
   determining that a first set of the first plurality of transaction requests requires biometric authentication by a sub-processing system including determining that the first set of the first plurality of transaction requests includes biometric data of cardholders initiating said transaction requests, the biometric data used for authenticating the cardholders;
   transmitting the first set of the first plurality of transaction requests to the sub-processing system;
   computing, by the processor, an average response time of the sub-processing system for processing the first set of the first plurality of transaction requests;
   determining a delta value equaling a difference between the first threshold level and the average response time;
   receiving a second plurality of transaction requests;
   determining that a second set of the second plurality of transaction requests requires biometric authentication by the sub-processing system;
   determining a throttle level by which to reduce transmission of the second set of the second plurality of transaction requests to the sub-processing system based, at least in part, on the delta value;
   identifying one or more of the second set of the second plurality of transaction requests as failure candidates based at least in part on the throttle level, the average response time and the first threshold level;
   prioritizing failure of the failure candidates based at least in part on a plurality of factors associated with each failure candidate of the failure candidates, wherein the plurality of factors includes at least one of a merchant bank and an issuer; and failing one or more of the failure candidates based on the prioritization, wherein the one or more failure candidates are maintained in a queue of pending requests, and wherein each pending request includes an indicator of an amount of remaining processing time associated with that request.

2. The method of claim 1, wherein computing an average response time further includes computing a decaying weighted average response time over a window of time, and wherein at least one transaction request of the first plurality of transaction requests and at least one other transaction request of the second plurality of transaction requests do not require biometric authentication by the sub-processing system.

3. The method of claim 1, wherein the first threshold level is based at least in part on one or more of a demand for transaction processing and the throttle level for transactions sent to the sub-processing system.

4. The method of claim 1, wherein the first threshold level is based at least in part on one or more of the average response time and the service level agreement (SLA) time, and wherein the plurality of factors includes a type of transaction, a class of a payment card, a merchant type, the merchant bank, and the issuer.

5. The method of claim 2 wherein determining the throttle level further comprises:
determining a ratio of (i) a transaction duration for a predicted demand and (ii) the decaying weighted average response time for at least one past window of time; and
determining a product of the ratio and a maximum demand capable of being processed within the SLA time.

6. The method of claim 5 further comprising altering the throttle level based at least in part on the average response time.

7. The method of claim 6 further comprising comparing a demand for transaction processing and the throttle level, wherein altering the throttle level is further based at least in part on the comparing.

8. The method of claim 6 further comprising comparing the average response time and a service level agreement (SLA) time, wherein altering the throttle level is further based at least in part on the comparing.

9. A computing device for throttling transaction processing, said computing device comprising a processor communicatively coupled to a memory, said computing device programmed to:
identify a first threshold level for transaction processing in compliance with a service level agreement (SLA) time;
receive a first plurality of transaction requests;
determine that a first set of the first plurality of transaction requests requires biometric authentication by a sub-processing system including determining that the first set of the first plurality of transaction requests includes biometric data of cardholders initiating said transaction requests, the biometric data used for authenticating the cardholders;
transmit the first set of the first plurality of transaction requests to the sub-processing system;
compute an average response time of the sub-processing system for processing the first set of the first plurality of transaction requests;
determine a delta value equaling a difference between the first threshold level and the average response time;
receive a second plurality of transaction requests, wherein the second plurality of transaction requests exceeds the first threshold level;
determine that a second set of the second plurality of transaction requests requires biometric authentication by the sub-processing system;
determine a throttle level by which to reduce transmission of the second plurality of transaction requests to the sub-processing system based, at least in part, on the delta value;
identify one or more of the second set of the second plurality of transaction requests as failure candidates based at least in part on the throttle level, the average response time and the first threshold level;
prioritize failure of the failure candidates based at least in part on a plurality of factors associated with each failure candidate of the failure candidates, wherein the plurality of factors includes at least one of a merchant bank and an issuer; and
fail one or more of the failure candidates based on the prioritization, wherein the one or more failure candidates are maintained in a queue of pending requests, and wherein each pending request includes an indicator of an amount of remaining processing time associated with that request.

10. The computing device of claim 9, wherein computing an average response time further includes computing a decaying weighted average response time over a window of time, and wherein at least one transaction request of the first plurality of transaction requests and at least one other transaction request of the second plurality of transaction requests do not require biometric authentication by the sub-processing system.

11. The computing device of claim 9, wherein the first threshold level is based at least in part on one or more of a demand for transaction processing and the throttle level for transactions sent to the sub-processing system.

12. The computing device of claim 9, wherein the first threshold level is based at least in part on one or more of the average response time and the service level agreement (SLA) time, and wherein the plurality of factors includes a type of transaction, a class of a payment card, a merchant type, the merchant bank, and the issuer.

13. The computing device of claim 10, wherein, to determine the throttle level, the processor is further programmed to:
determine a ratio of (i) a transaction duration for a predicted demand and (ii) the decaying weighted average response time for at least one past window of time; and
determine a product of the ratio and a maximum demand capable of being processed within the SLA time.

14. The computing device of claim 13, wherein the processor is further programmed to alter the throttle level based at least in part on the average response time.

15. The computing device of claim 14, wherein the processor is further programmed to compare a demand for transaction processing and the throttle level, wherein altering the throttle level is further based at least in part on the comparing.

16. The computing device of claim 14, wherein the processor is further programmed to compare the average response time and a service level agreement (SLA) time, wherein altering the throttle level is further based at least in part on the comparing.

17. At least one non-transitory computer-readable storage media having computer-executable instructions embodied thereon, wherein when executed by at least one processor, the computer-executable instructions cause the processor to:
- identify a first threshold level for transaction processing in compliance with a service level agreement (SLA) time;
- receive a first plurality of transaction requests;
- determine that a first set of the first plurality of transaction requests requires biometric authentication by a sub-processing system including determining that the first set of the first plurality of transaction requests includes biometric data of cardholders initiating said transaction requests, the biometric data used for authenticating the cardholders;
- transmit the first set of the first plurality of transaction requests to the sub-processing system;
- compute an average response time of the sub-processing system for processing the first set of the first plurality of transaction requests;
- determine a delta value equaling a difference between the first threshold level and the average response time;
- receive a second plurality of transaction requests;
- determine that a second set of the second plurality of transaction requests requires biometric authentication by the sub-processing system;
- determine a throttle level by which to reduce transmission of the second set of the second plurality of transaction requests to the sub-processing system based, at least in part, on the delta value;
- identify one or more of the second set of the second plurality of transaction requests as failure candidates based at least in part on the throttle level, the average response time and the first threshold level;
- prioritize failure of the failure candidates based at least in part on a plurality of factors associated with each failure candidate of the failure candidates, wherein the plurality of factors includes a merchant bank and an issuer; and
- fail one or more of the failure candidates based on the prioritization, wherein the one or more failure candidates are maintained in a queue of pending requests, and wherein each pending request includes an indicator of an amount of remaining processing time associated with that request.

18. The computer-readable storage media of claim 17, wherein computing an average response time further includes computing a decaying weighted average response time over a window of time, and wherein at least one transaction request of the first plurality of transaction requests and at least one other transaction request of the second plurality of transaction requests do not require biometric authentication by the sub-processing system.

19. The computer-readable storage media of claim 17, wherein the first threshold level is based at least in part on one or more of a demand for transaction processing and the throttle level for transactions sent to the sub-processing system.

20. The computer-readable storage media of claim 17, wherein the first threshold level is based at least in part on one or more of the average response time and the service level agreement (SLA) time, and wherein the plurality of factors includes a type of transaction, a class of a payment card, a merchant type, the merchant bank, and the issuer.

21. The computer-readable storage media of claim 18, wherein the computer-executable instructions further cause the processor to:
- determine a ratio of (i) a transaction duration for a predicted demand and (ii) the decaying weighted average response time for at least one past window of time; and
- determine a product of the ratio and a maximum demand capable of being processed within the SLA time.

22. The computer-readable storage media of claim 21, wherein the computer-executable instructions further cause the processor to alter the throttle level based at least in part on the average response time.

23. The computer-readable storage media of claim 22, wherein the computer-executable instructions further cause the processor to compare a demand for transaction processing and the throttle level, wherein altering the throttle level is further based at least in part on the comparing.

24. The computer-readable storage media of claim 22, wherein the computer-executable instructions further cause the processor to compare average response time and a service level agreement (SLA) time, wherein altering the throttle level is further based at least in part on the comparing.

* * * * *